US 6,574,455 B2

(12) United States Patent
Jakobsson et al.

(10) Patent No.: US 6,574,455 B2
(45) Date of Patent: Jun. 3, 2003

(54) METHOD AND APPARATUS FOR ENSURING SECURITY OF USERS OF BLUETOOTH TM-ENABLED DEVICES

(75) Inventors: Bjorn Markus Jakobsson, Hoboken, NJ (US); Susanne Gudrun Wetzel, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/851,098

(22) Filed: May 8, 2001

(65) Prior Publication Data
US 2002/0025780 A1 Feb. 28, 2002

Related U.S. Application Data
(60) Provisional application No. 60/229,130, filed on Aug. 30, 2000, and provisional application No. 60/234,426, filed on Sep. 21, 2000.

(51) Int. Cl.⁷ .................................................. H04Q 7/20
(52) U.S. Cl. ........................ 455/41; 455/411; 455/517
(58) Field of Search ................................ 455/443, 410, 455/411, 421, 422, 517, 518, 519, 444, 465, 462, 41; 370/338, 471, 349; 379/35, 32.05; 340/825.08, 825.06; 713/161, 163, 162, 170, 200, 201, 150

(56) References Cited
U.S. PATENT DOCUMENTS

| | | | | |
|---|---|---|---|---|
| 4,933,969 A | * | 6/1990 | Marshall et al. | 380/284 |
| 6,246,376 B1 | * | 6/2001 | Bork et al. | 342/357.13 |
| 6,275,500 B1 | * | 8/2001 | Callaway et al. | 370/346 |
| 6,297,737 B1 | * | 10/2001 | Irvin | 340/3.51 |
| 6,339,706 B1 | * | 1/2002 | Tillgren et al. | 455/419 |
| 6,366,622 B1 | * | 4/2002 | Brown et al. | 329/304 |
| 6,366,840 B1 | * | 4/2002 | Buckley | 340/425.5 |
| 6,405,027 B1 | * | 6/2002 | Bell | 455/403 |
| 6,408,232 B1 | * | 6/2002 | Cannon et al. | 123/493 |

* cited by examiner

Primary Examiner—Nay Maung
Assistant Examiner—Jean A Gelin
(74) Attorney, Agent, or Firm—Stephen M. Gurey

(57) ABSTRACT

Rather than including a static network descriptor in messages transmitted between master and slave Bluetooth-enabled devices communicating on a piconet, which network descriptor is computed as a known function of the master's Bluetooth address (BD_ADDR), the network descriptor is changed each time a new session beings on one of the devices. This prevents an intentional eavesdropper, who may be in proximity to the piconet and who may be listening for and detecting the network descriptor included within these messages, from associating a detected network descriptor with a particular device of a user and thereafter using that network descriptor to track the location of the user who is carrying and using that device. The network descriptor, the channel access code (CAC), is changed each time a new session begins by computing it as a known function of a seed and the master's BD_ADDR, wherein the seed is a random number chosen at the beginning of each new session by the master. For further security, CAC is changed not only when a new session begins but within each session on a periodic basis. For the latter, the seed is a combination of the random number generated for each session by the master and a time parameter associated with the master.

40 Claims, 5 Drawing Sheets

METHOD AND APPARATUS FOR ENSURING SECURITY OF USERS OF BLUETOOTH TM-ENABLED DEVICES

CROSS-REFERENCE

This application claims the benefit of U.S. Provisional Application No. 60/229,130, filed Aug. 30, 2000 and No. 60/234,426, filed Sep. 21, 2000. This application also describes and claims subject matter that is described in our co-pending United States patent application filed simultaneously herewith also entitled: "METHOD AND APPARATUS FOR ENSURING SECURITY OF USERS OF BLUETOOTH-ENABLED DEVICES", Ser. No. 09/851,223, filed May 8, 2001.

TECHNICAL FIELD

This invention relates to wireless communication on a small local area network (LAN), and more particularly, to local wireless communication between devices operating in accordance with the Bluetooth™ standard.

BACKGROUND OF THE INVENTION

Bluetooth is a recently proposed standard for local wireless communication of mobile or potentially mobile devices, such as cellular phones, wireless headsets, computers, printers, cars, and turn-stiles, allowing such devices in the proximity of each other to communicate with each other (see, e.g., http://www.bluetooth.com; "Specification of the Bluetooth System", Core, Specification Volume 1, v.1.1, Feb. 22, 2001; and "Specification of the Bluetooth System", Profiles, Specification Volume 2, v.1.1, Feb. 22, 2001. The standard promises a variety of improvements over current functionality, such as hands-free communication and effortless synchronization. It therefore allows for new types of designs, such as phones connected to wireless headsets; phones connected to the emergency system of cars; computers connected to printers without costly and unsightly cords; and phones connected to digital wallets, turn-stiles and merchant establishments.

On a small wireless LAN, known as a piconet, all Bluetooth-enabled devices within a set of such devices communicate with a master device within the set, which is selected as the master when the piconet is established. The master device controls the other slave devices within the set, determining which device transmits and which device receives at any given instant. The slave devices on each wireless LAN need to be within approximately 30 feet of the master device for communication to proceed. Since a Bluetooth-enabled device might be within the range of more than one piconet, protection is incorporated to enable a receiving device to discriminate between messages it should properly act on from another device within its own piconet, and messages it should ignore from a device on another piconet that is outside the set. In order to prevent such interference, the prior art Bluetooth standard requires that each message sent by a device include a network descriptor. All messages between the master device and any of the slave devices on the same piconet then contain that same descriptor so when any device on another piconet "hears" a message with a different network descriptor, it knows to ignore it. The network descriptor used on each piconet is a channel access code (CAC) that is determined as a function of a device identifier, a so-called 48-bit Bluetooth Address (BD_ADDR), that is associated with the master in the LAN, each Bluetooth device having a unique BD_ADDR stored in its memory. Thus, when a device is designated as a master upon formation of a piconet, a CAC is computed as a deterministic function of its BD_ADDR, which CAC is then used as the network descriptor for all messages sent over the piconet between the master and any slave devices within the defines set. The slaves, upon learning the BD_ADDR of the master, are able to compute that same CAC using the known deterministic function, thereby knowing which messages to listen for and what network descriptor to use in communicating messages back to the slave.

The problem with this arrangement is that the privacy of an individual using a Bluetooth device can be attacked. For example, if a user having a master Bluetooth-enabled cellular phone, a slave Bluetooth-enabled wireless headphone, and a slave Bluetooth-enabled CD player were to enter an area in which an intentional eavesdropper equipped with a receiver was located, that individual could learn the network descriptor associated with that user's cellular phone by detecting and "examining" the network descriptor used in the messages to and from that master. That eavesdropper could thereafter track the physical location of that user by "listening" in various locations for messages containing that same network descriptor. Thus, for example, if the network descriptor associated with a political figure's cell phone was determined, then eavesdropping receivers could track visits by that figure to what might be politically embarrassing locations. Further, if the network descriptors associated with the Bluetooth devices of multiple individuals were determined, subsequent meetings of those individuals could be tracked by the coincidence of location and time of multiple messages containing network descriptors associated with these individuals. In addition to these privacy issues, various security issues are present once a user's network descriptor is compromised. Specifically, once the network descriptor is determined, the intentional eavesdropper could inject messages into the piconet in a manner that receiving devices within the piconet would assume to be originating from within the piconet from a valid device. This is referred to as an authentication problem since the authenticity of the messages cannot be guaranteed.

A more secure method of communication that eliminates the above-described problems is thus needed.

SUMMARY OF THE INVENTION

In accordance with the present invention, rather than associating a fixed network descriptor with each device within a defined set, the network descriptor associated with a device within the set is modified over time to prevent an eavesdropper using a device outside the defined set from associating the network descriptor with a particular user.

In a first embodiment of the invention, the network descriptor is changed from session to session, where a session is defined to be the duration of one event such as one phone conversation, listening to one CD, or printing one job on a printer. In this embodiment, when a session starts and communication between a master and slave begins, the master selects a random number, a so-called seed, which is sent along with the master's BD_ADDR to the slave. Both the master and the slave then compute a network descriptor, the CAC, as a function of both that random number and the master's BD_ADDR. When a new session begins, the master selects a new random number, a new seed, which is sent to the slave, and which is then used by both the master and the slave to compute a new CAC, which is then used as the network descriptor for this new session. An eavesdropper, thus, will be unable to determine that the network descriptors, the CACs, which are used for both of the sessions, are generated by the same BD_ADDR, and will be unable to track the user by listening for messages containing a particular network descriptor.

A second embodiment of the present invention provides a finer-grained solution to the security problem. In this embodiment, rather than recalculating the CAC on a session-driven basis alone, when a session begins, the master transmits to the slave a time parameter together with its BD_ADDR and its chosen random number, the random number and the time parameter together forming the seed, where the time parameter is a value associated with the master's internal clock. The master and the slave thus both compute the CAC for the session as a function of the master's BD_ADDR, the random number, and the time parameter. Rather than maintaining that same CAC throughout the duration of the session as in the first embodiment, the CAC is periodically recomputed throughout the session by both the master and slave using the then current time parameter. Thus, if a session has a long duration, the network descriptor does not remain static and open to attack.

As a modification to both the first and second embodiments, the CAC computed at the beginning of a session is computed as a function of a combination of the master's BD_ADDR and the new random number and at least one previous random number, in addition to, depending upon the embodiment, the time parameter. Thus, in the first embodiment, when an attacker is present at the beginning of a session and learns of both the master's BD_ADDR and the currently selected random number, he will be unable to determine the network descriptor without also having been present at the beginning of the previous sessions.

DETAILED DESCRIPTION

Figure 1:
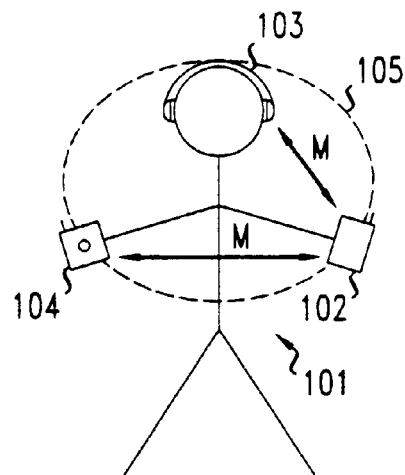
FIG. 1 is a diagram showing a user carrying three Bluetooth-enabled devices on his person that communicate with each other on a piconet.

FIG. 1 shows a user 101 having three active Bluetooth-enabled devices: a cell phone 102, a wireless headset 103, and a CD player 104. When a piconet is established on which these three devices within this defined set communicate, the cell phone 102 is established as the master device, with the wireless headset 103 and CD player 104 being slave devices. The cell phone 102 acts as an intermediary and controller, and all messages from the slaves 103 and 104 are sent to the master cell phone 102 before being passed to the other. Thus, for example, the digitized audio output of the CD player 104 is sent as messages to the master cell phone 102 before being forwarded by the cell phone to the wireless headset 103 for the user's enjoyment. As a controller, the master cell phone can be programmed to switch off the CD player 104 when an incoming phone call arrives and then pass the call to the wireless headset 103 for reception by the user. Generally, the range of Bluetooth-enabled devices is approximately 30 feet. Thus, should the user place the CD player 104 on a table, he needs to remain within 30 feet to maintain reception, assuming the cell phone 102 remains on his person.

Figure 2:
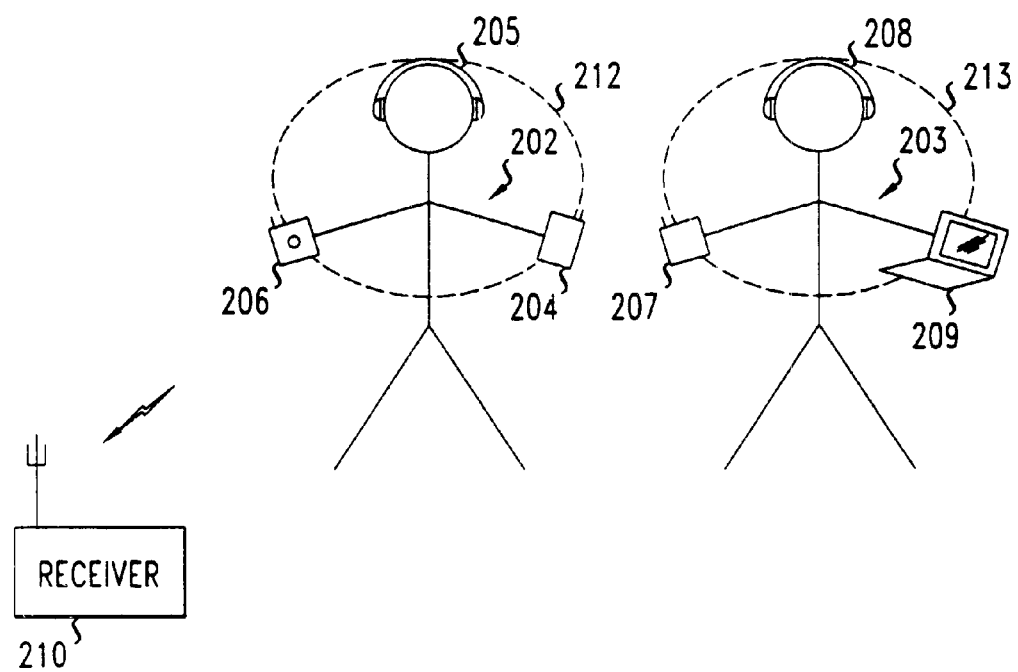
FIG. 2 shows two users whose Bluetooth-enabled devices are within the range of more than one piconet.

A Bluetooth-enabled device can physically be within the range of more than one piconet, such as is shown in FIG. 2, where the devices being used by users 202 and 203 fall within each other's ranges. Thus, the Bluetooth-enabled cell phone 204, headset 205, and CD player 206 of user 202 on piconet 212 are within range of the cell phone 207, headset 208, and laptop computer 209 of user 203 on piconet 213. As previously noted, in order to prevent one of the devices on piconet 212 from interfering with any of the devices on piconet 213, or vice versa, the Bluetooth standard requires each message to include a network descriptor that is used in all messages on a particular piconet. Thus, messages sent to and from the master cell phone 204 in one defined set on the piconet 212 will be ignored by the devices 207, 208 and 208 in a second defined set since the network description in each of those messages on piconet 213 is different than the network descriptor in each of messages on piconet 213.

Figure 3:
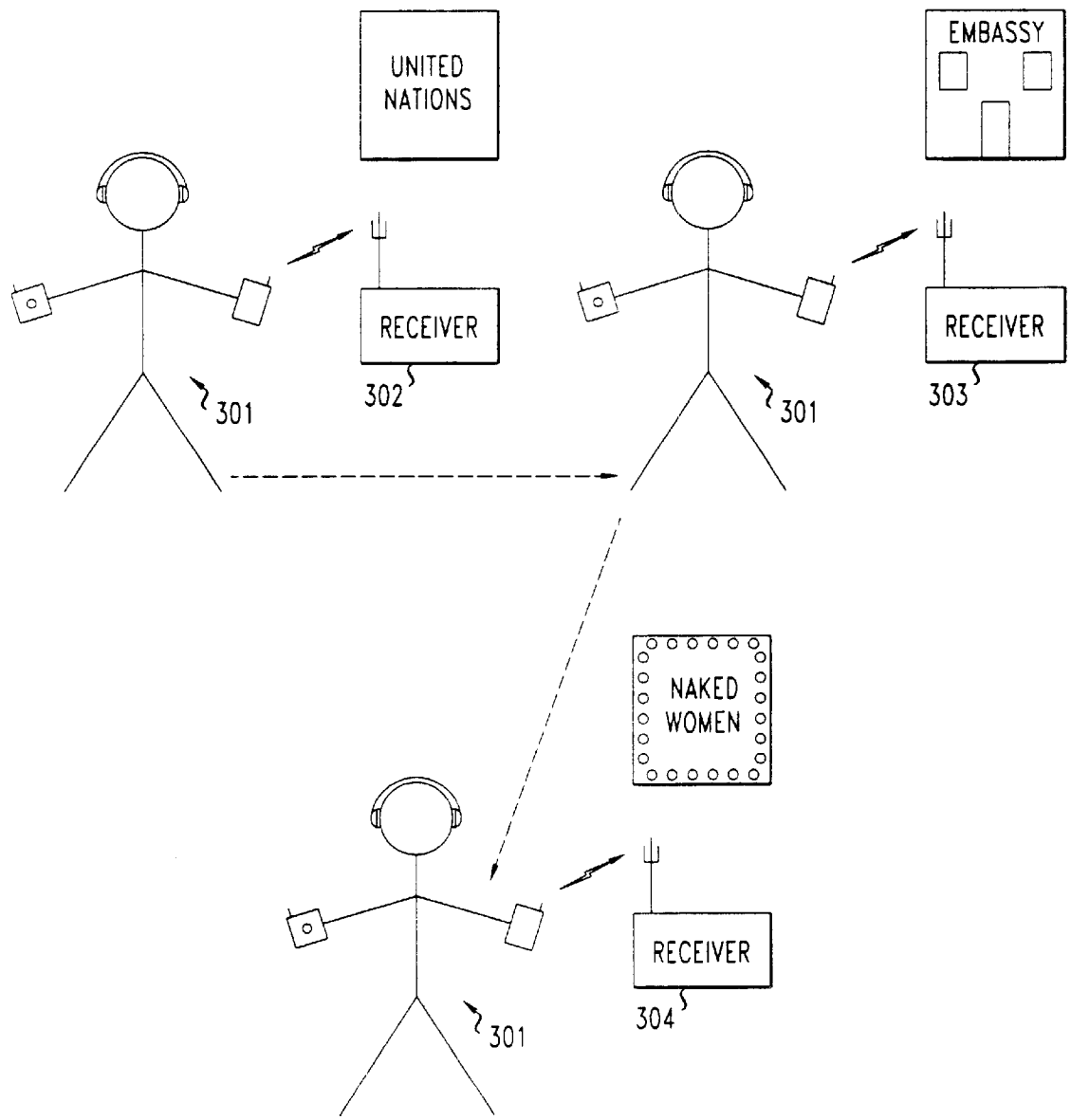
FIG. 3 illustrates a nefarious eavesdropper tracking the location of the user of a Bluetooth-enabled device.

As previously described, in the prior art, an intentional eavesdropper "listening" though a receiver device 210 outside the defined set but within the range of user 202 could determine the network descriptor used by that user's devices. Thus, once that network descriptor was determined, the user's location could be tracked as he passed within the range of other receivers. As shown in FIG. 3, therefore, as the user 301 moves throughout the city, he could be tracked by receivers 302, 303 and 304, for example, which are each "listening" for messages having that same determined network descriptor. Alternatively, once a user's network descriptor is determined, an intentional eavesdropper who is within range of the piconet could inject messages into the piconet in such a manner that the other devices on the piconet would believe them to be authentic. Thus, the other devices on the piconet would receive and could act upon forged information.

In order to prevent the afore-described problems associated with the prior art, the present invention modifies over time the network descriptor associated with a Bluetooth-enabled device. In a first embodiment of the present invention, the network descriptor is changed each time a new session begins on the piconet. A session is defined by the duration of one event such as, in FIG. 1, a phone conversation by the user over the cell phone 102 or the playing of a single CD on the CD player 104. Thus, for the Bluetooth-enabled devices in FIG. 1, a new session begins upon the start on a new phone conversation or the playing of a new CD. At the beginning of a new session, in accordance with this embodiment of the invention, the master sends to the slave a random number, a seed, with the BD_ADDR of the master, that are together used by both the master and the slave to compute a CAC for use by the master and the slave as a network descriptor for the duration of that session. In a preferred embodiment, the function used the compute CAC from the BD_ADDR of the master and the seed is a so-called one-way function such as the well-known SHA1, or MD5 functions. Such one-way functions prevent the reverse engineering of the inputs to the function given the output of the function, as is well understood by those skilled in the art.

Figure 4:
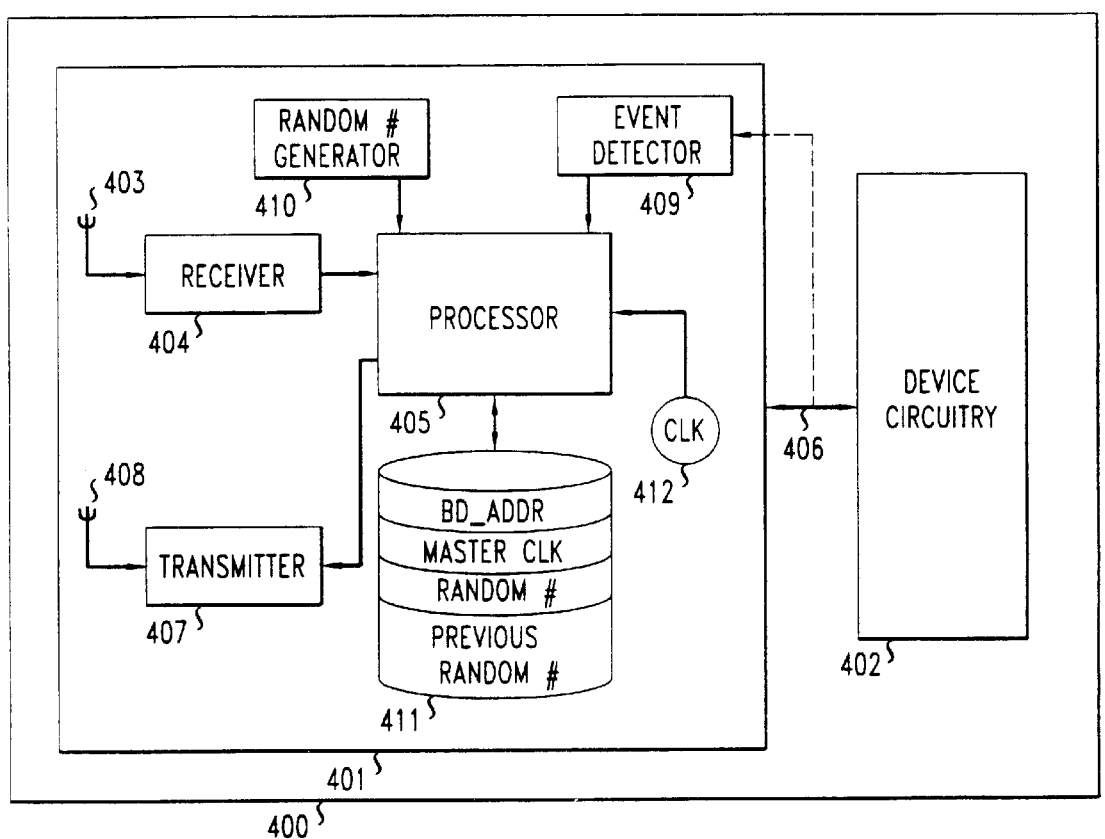
FIG. 4 is a block diagram of a Bluetooth-enabled device in accordance with the present invention.

FIG. 4 is a block diagram that functionally shows a Bluetooth-enabled device 400 in accordance with the invention. As shown, device 400 functionally separates the Bluetooth-functioning elements 401 that cause the device to operate in accordance with the Bluetooth specifications, and the other device circuitry 402 that performs the functions associated with the particular type of unit that the entire device 400 is, such as in the example of FIG. 1, a cell phone, a wireless headset, or a CD player. The Bluetooth-functioning elements 401 include a receiving antenna 403, which receives wireless-transmitted messages from the other devices on the piconet, and passes them on to a receiver 404. Receiver 404 outputs the demodulated messages and inputs them to a processor 405. In addition to performing the functions necessary to implement the present invention, i.e., to periodically compute the CAC as a function of the seed and the BD_ADDR of the master, processor 405 performs other required Bluetooth operations, which are not discussed further since they are not necessary for an understanding of the present invention. The information within each received message is passed to the device circuitry 402 for device-specific processing over a link 406, which may be a serial or parallel bus or other cabled arrangement, or a wireless connection. Outgoing messages, originating either within the device circuitry 402 or within processor 405, are passed to a transmitter 407 for modulation and output onto output antenna 408. A common antenna may share the functions of antennas 403 and 408 shown in FIG. 4.

In order to perform the functions of the present invention, the Bluetooth-functioning elements 401 are shown including an event detector 409, which may be a separate element as shown, or incorporated as part of processor 405. If device 400 is the master on the piconet and a new session begins within the device circuitry 402 of that device, event detector 409 is triggered, thereby signaling processor 405 to compute a new CAC. If a new session begins within the device circuitry of a slave, that information is communicated to the master and event detector 409. Upon being triggered by event detector 409, processor 405 retrieves a random number from random number generator 410 to act as a seed in calculating the CAC as a predetermined function of the retrieved random number and this device's, the master's, BD_ADDR. Although shown as a separate element, the random number generator 410 could be incorporated within processor 405 and could generate the random number from various sources of randomness such as radio activity or using cryptographic techniques such as one-way functions. As shown in FIG. 4, the BD_ADDR is stored in a memory 411 associated with processor 405 but may actually be hard-wired as part of the Bluetooth-functioning elements 401. As previously noted, the predetermined function used to compute CAC is preferably a one-way function. The random number used to compute CAC, which is also stored in memory 411, is also communicated to the slave where it is used, together with the master's BD_ADDR, to compute CAC using the same function. Thus, if device 400 is not the master but a slave on the piconet, memory 411 stores the BD_ADDR of the master and the current random number used to compute CAC. When a new session is detected, therefore, the random number in memory 411 is replaced by the random number generated at the master and a new CAC is computed and used as the network descriptor in all messages until the next session begins.

Figure 5:
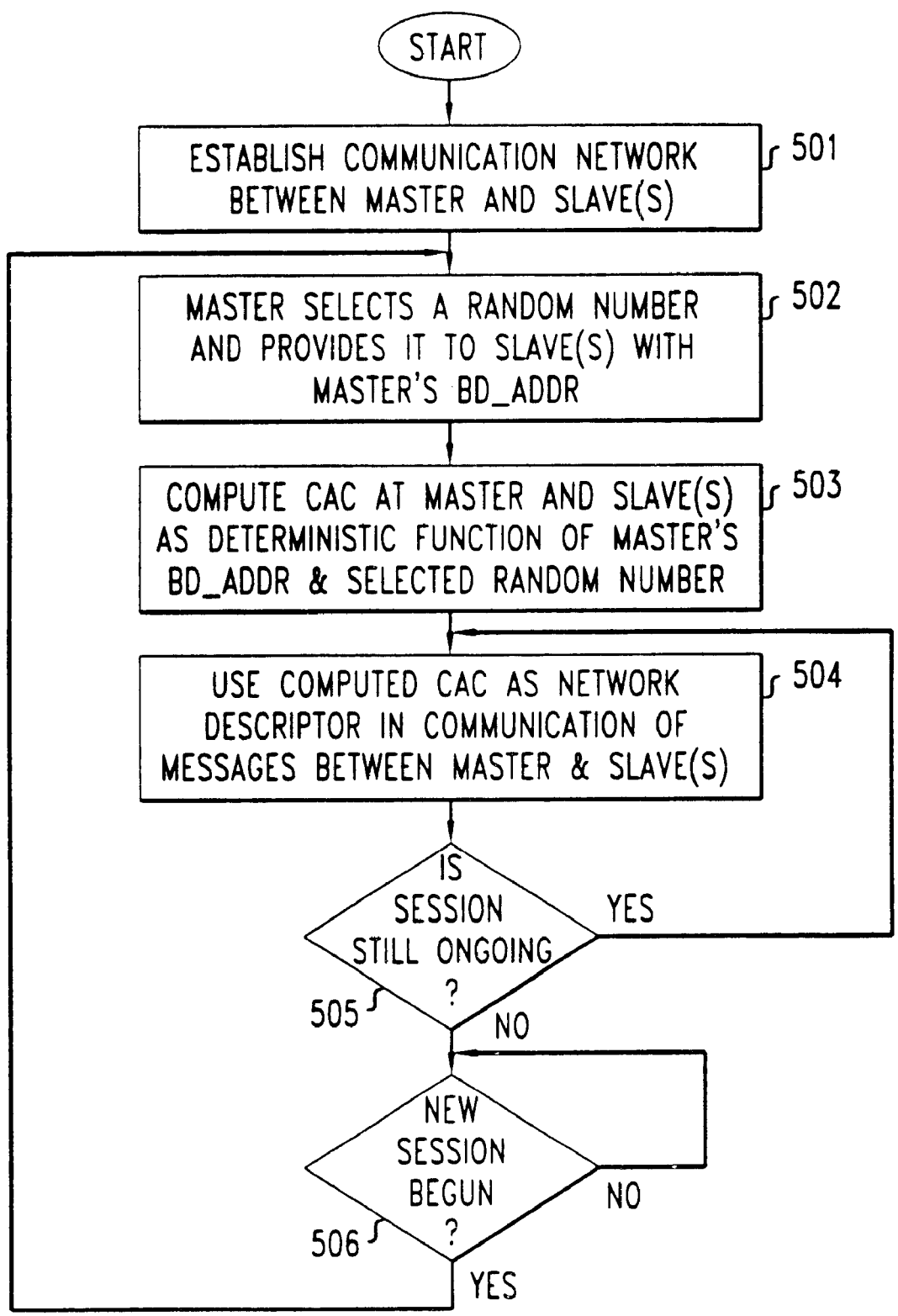
FIG. 5 is a flow chart detailing the steps of a first embodiment of the present invention.

FIG. 5 is a flowchart that illustrates the steps of this first embodiment of the invention. At step 501, a communication network is established between the designated master and the slave(s). At step 502, the master selects a random number to be used as the seed, which is provided to the slave(s) together with the master's BD_ADDR. At step 503, the master and the slave(s) compute CAC a deterministic function of the master's BD_ADDR and the selected random number. At step 504, that computed CAC is used as the network descriptor in all messages transmitted between the master and the slave(s). At step 505, a determination is made whether the current session is still ongoing. If yes, at step 504 again, the same computed CAC continues to be used as the network descriptor in all messages between the master and the slave(s). If, at step 505, the determination is made that the current session in not still ongoing, then, at step 506, a determination is made whether a new session has begun. If yes, the flow returns to step 502, where the master selects a new random number to used as the seed and which new seed is provided to the slave(s). Again, as previously described, a new CAC is computed by the master and the slave(s), which is used as the network descriptor in all messages between the master and the slave(s) until that session ends.

An intentional eavesdropper will thus first "hear" $CAC_1$ computed for use during the first session in the messages it captures. When that session ends, the eavesdropper will no longer hear $CAC_1$ in any message. When a new session begins, the eavesdropper will "hear" $CAC_2$, computed for use during the second session, in the messages it overhears. The eavesdropper can't, however, determine that both $CAC_1$ and $CAC_2$ have been generated from the same BD_ADDR, and therefore is precluded from tracking the locations of the individual using the Bluetooth-enabled device as that Bluetooth user moves from location-to-location.

If a session lasts a long period of time, such as during a long telephone call, the CAC remains invariant in the first embodiment described above. The inentional eavesdropper, by listening for the CAC being used, would then be able to track the user throughout the duration of that session. In order to prevent a potential a breech of privacy in such a situation, a second embodiment of the present invention provides a finer-grained solution to the problem. In accordance with the second embodiment of the invention, when a session begins, the master sends to the slave(s), together with its BD_ADDR, a seed that consists of a randomly generated number plus a time parameter associated with the master's internal clock. The master and the slave(s) then compute the CAC as a predetermined function of the BD_ADDR, the random number and the time parameter. Thereafter, throughout the same session, the CAC is automatically recomputed at the end of every interval of predetermined duration using the then current time parameter associated with the master's clock. The CAC is thus changed at a much faster rate than in the purely session-driven embodiment described above. The intentional eavesdropper then has much greater difficulty tracking the location of the user of the Bluetooth-enabled device by "listening" for a particular CAC.

In order to implement this second embodiment, the Bluetooth-enabled device 400 in FIG. 4 stores the time parameter associated with the master's clock in memory 411. Processor 405 then thereafter re-computes the CAC based on the master's BD_ADDR, the current session's random number, and that stored master's time parameter as it is modified by the accumulated predetermined time intervals that have passed since the session began, the latter being determined by clock 412. Clock 412 is shown for illustrative purposes as a separate element but in practice could be incorporated into the processor 405. If device 400 is the master, when a session begins the then current value of clock 412 is stored in memory 411 and sent together with the random number outputted by random number generator 410 to the slave(s).

Figure 6:
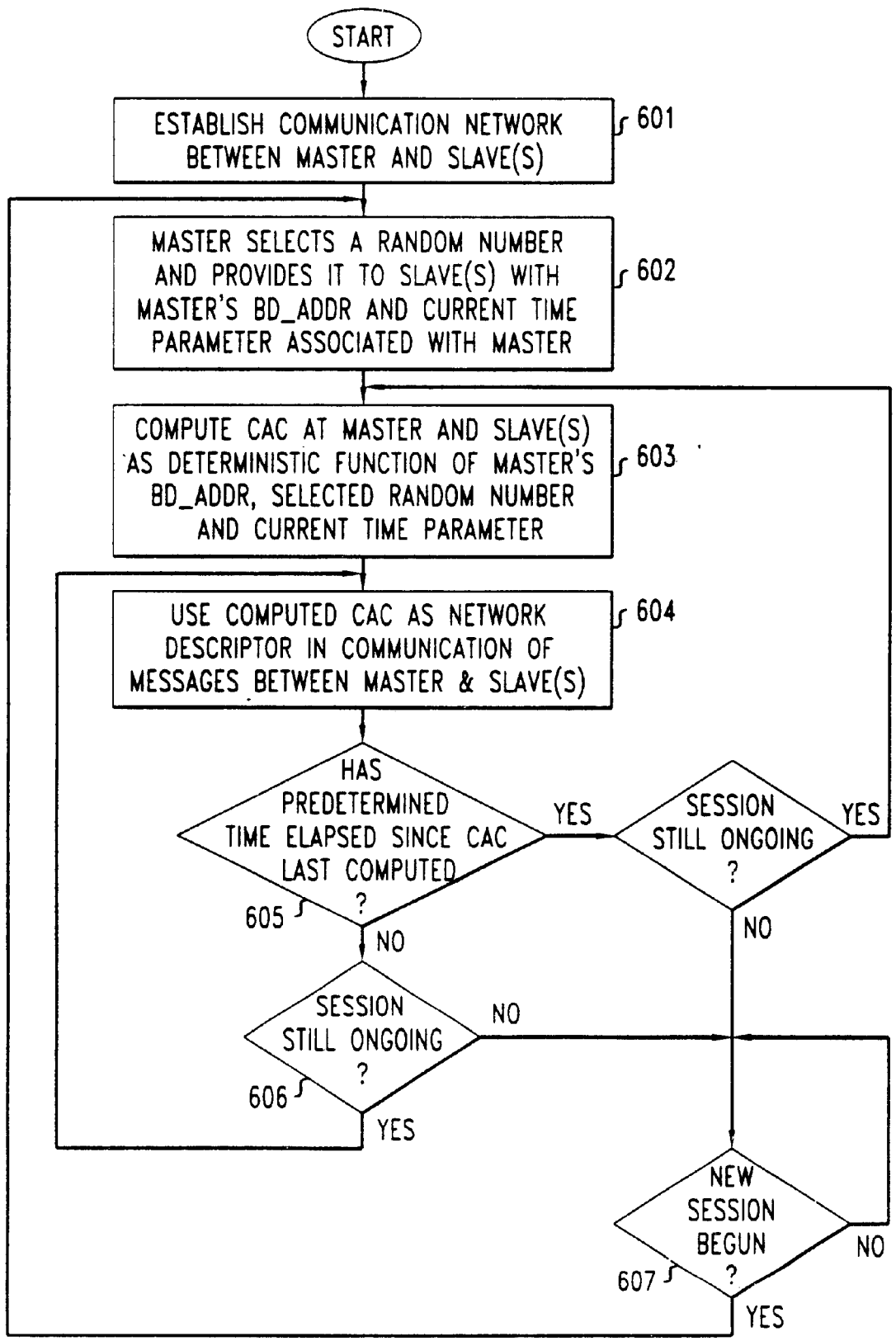
FIG. 6 is a flow chart detailing the steps of a second embodiment of the present invention.

FIG. 6 is a flowchart that illustrates the steps of this second embodiment. At step 601 communication is established between the master and the slave(s). At step 602, a random number is selected by the master and provided to the slave(s) together with the master's BD_ADDR and a current time parameter associated with the master. At step 603, the master and the slave(s) compute CAC as a deterministic function of the master's BD_ADDR, the selected random number and the current time parameter associated with the master. At step 604, that computed CAC is used as the network descriptor in all the messages between the master and the slave(s). At step 605, a determination is made whether the predetermined time interval has elapsed since the CAC was last computed. If it has not, then at step 606, a determination is made whether the current session is still ongoing. If it is, then the previously computed CAC continues to be used as the network descriptor in each message. If the current session is not ongoing, the flow proceeds to decision step 607 to await the beginning a new session. When a new session begin, the flow returns to step 602 where a new random number and the then current master's time parameter are used as a seed to compute a new CAC as a function of that seed and the master's BD_ADDR. If, at step 605, a determination is made that the predetermined time interval has elapsed and, at step 608, the current session is still ongoing, then the flow returns to step 604 where the CAC is recomputed as the predetermined function of the master's BD_ADDR, the previously determined random number and the then current master's time parameter. If, at step 608, the current session is not still ongoing, then the flow proceeds to step 607 to await the beginning of a new session. Upon the occurrence of a new session, the flow returns to step 602. As previously, at step 602, a new random number is selected by the master and combined with the master's then current time parameter to form a seed that is used together with the master's BD_ADDR to compute the CAC.

The embodiments described above can be modified to add even further protection to prevent the intentional eavesdropper from tracking the location of the user of a Bluetooth-enabled device. Specifically, in the purely session-driven embodiment described above, rather than using the random number outputted by random number generator 410 as a seed in computing CAC as a function of that random number and the master's BD_ADDR, the random number outputted by random number generator 410 is combined with at least one previous random number. The combination of these random numbers is then used as the seed in computing CAC as a function of that combination and the master's BD_ADDR. Thus, in this embodiment, if the attacker is present when a session is set up and learns of the random number being passed from the master to the slave(s), he will not be able to compute CAC without also having been present when each previous session was set up when the previous random numbers were passed. Thus, in this embodiment, memory 411, within the Bluetooth elements 401, also includes at least one storage location for storing the at least one previous random number outputted by random number generator 410.

The second embodiment of the invention in which the CAC is re-computed not only at the beginning of each session, but periodically within each session, can also be similarly modified. Thus, the random number used as the seed to compute the CAC at the beginning of each session or within each session at the end of each periodic interval is a combination of a random number outputted by random number generator 210 at that time and at least one previous random number that is stored in memory 311.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, although the present invention has been described above for use by Bluetooth-enabled devices on a wireless network, the present invention could be used on any type of communication network, in which multiple of devices within a defined set, Bluetooth-enabled or not, are communicating with each other. From a practical standpoint, however, the invention is most likely to find use on a wireless network where devices communicate with each other in a master-slave relationship.

It will be further appreciated by those skilled in the art that the block diagrams herein represent conceptual views of illustrative circuitry embodying the principles of the invention. Similarly, it will be appreciated that the flow charts represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, read-only memory (ROM) for storing software, random access memory (RAM) and non-volatile storage. Other hardware, conventional and/or custom, may also be included.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method for use in a network over which multiple devices belonging to a defined set communicate with each other by sending messages, the method comprising:

in each message, including a network descriptor that is determined as a known function of at least a particular identifier associated with at least one of the devices and which is used by all potential devices to determine whether they are intended devices;

characterized in that the method further comprises:

changing the network descriptor over time, whereby the network descriptor in the messages received by a device outside the defined set is impeded from being associated with a particular device within the defined set.

2. The method of claim 1 wherein the network descriptor is changed when a session begins on one of the devices within the set.

3. The method of claim 2 wherein the network descriptor is computed as a known function of a seed and the particular identifier associated with at least one of the devices.

4. The method of claim 3 wherein the known function is a one-way function.

5. The method of claim 3 wherein the seed is at least a first random number generated by at least one of the devices for use in computing the network descriptor used in messages within a current session.

6. The method of claim 5 wherein the seed is combination of the first random number and at least a second random number generated by at least one of the devices for use in computing the network descriptor used in messages within at least one previous session.

7. The method of claim 2 wherein after a session begins the network descriptor is further changed on a periodic basis within the duration of the session.

8. The method of claim 7 wherein the network descriptor is computed as a known function of a seed and the particular identifier associated with at least one of the devices.

9. The method of claim 8 wherein the seed is a combination of at least a time parameter associated with at least one of the devices and a first random number generated by at least one of the devices for use in computing the network descriptor used in messages within a current session.

10. The method of claim 9 wherein the seed is a combination of the time parameter associated with at least one of the devices, the first random number, and at least a second random number generated by at least one of the devices for use in computing the network descriptor used in messages within at least one previous session.

11. A method for use in a wireless network over which multiple Bluetooth-enabled devices within a defined set communicate with each other by sending messages to and from a master device within the set, the method comprising:

in each message, sending a channel access code (CAC) that is a known function of a Bluetooth address (BD_ADDR) associated with the master device and which is used by all potential devices to determine whether they are intended devices;

characterized in that the method further comprises:

changing the CAC over time, whereby the CAC in the messages received by a device outside the defined set is impeded from being associated with a particular device within the defined set.

12. The method of claim 11 wherein the CAC is changed when a session begins on one of the devices within the set.

13. The method of claim 12 wherein the CAC is computed as a known function of a seed and the BD_ADDR of the master device.

14. The method of claim 13 wherein the known function is a one-way function.

15. The method of claim 13 wherein the seed is at least a first random number generated by at least one of the devices for use in computing the CAC used in messages within a current session.

16. The method of claim 15 wherein the seed is a combination of the first random number and at least a second random number generated by at least one of the devices for use in computing the CAC used in messages within at least one previous session.

17. The method of claim 12 where after a session begins the CAC is further changed on a periodic basis within the duration of the session.

18. The method of claim 17 wherein the CAC is computed as a known function of a seed and the BD_ADDR associated with the master device.

19. The method of claim 18 wherein the seed is a combination of at least a time parameter associated with at least one of the devices and a first random number generated by at least one of the devices for use in computing the CAC used in messages within a current session.

20. The method of claim 19 wherein the seed is a combination of the time parameter associated with at least one of the devices, the first random number, and at least a second random number generated by at least one of the devices for use in computing the CAC used in messages within at least one previous session.

21. Apparatus for use in a device that sends and receives messages to other devices within a defined set on a network, said apparatus comprising:

means for computing for inclusion within each message a network descriptor as a known function of at least a particular identifier associated with at least one of the devices within the set and which is used by all potential devices to determine whether they are intended devices; and means for changing the network descriptor over time, whereby the network descriptor in the messages received by a device outside the defined set is impeded from being associated with a particular device within the defined set.

22. The apparatus of claim 21 further comprising means for detecting the beginning of a session on one of the devices within the set, the changing means causing the computing means to recompute the network descriptor when the beginning of a session is detected.

23. The apparatus of claim 22 further comprising means for providing a seed to the computing means, the computing means computing the network descriptor as a known function of the seed and the particular alphanumeric characteristic associated with at least one of the devices.

24. The apparatus of claim 23 wherein the known function is a one-way function.

25. The apparatus of claim 23 wherein the seed is at least a first random number generated for use in computing the network descriptor used in messages within a current session.

26. The apparatus of claim 25 wherein the seed is a combination of the first random number and at least a second random number generated for use in computing the network descriptor used in messages within at least one previous session.

27. The apparatus of claim 22 wherein the changing means changes the network descriptor on a periodic basis within the duration of a session once the session begins.

28. The apparatus of claim 27 further comprising means for providing a seed to the computing means, the computing means computing the network descriptor as a known function of the seed and the particular identifier associated with at least one of the devices.

29. The apparatus of claim 28 wherein the seed is a combination of at least a time parameter associated with at least one of the devices and a first random number generated by at least one of the devices for use in computing the network descriptor used in messages within a current session.

30. The apparatus of claim 29 wherein the seed is a combination of the time parameter associated with at least one of the devices, the first random number and at least a second random number generated by at least one of the devices for use in computing the network descriptor used in messages within at least one previous session.

31. Apparatus for use in a Bluetooth-enabled device that sends and receives wireless messages to other Bluetooth-enabled devices within a defined set, said apparatus comprising:

means for computing for inclusion within each message a channel access code (CAC) as a known function of a Bluetooth address (BD_ADDR) associated with a master device within the defined set and which is used by all potential devices to determine whether they are intended devices; and means for changing the GAG over time, whereby the CAC in the messages received by a device outside the defined set is impeded form being associated with a particular device within the defined set.

32. The apparatus of claim 31 further comprising means for detecting the beginning of a session on one of the devices within the set, the changing means causing the computing means to recompute the CAC when the beginning of a session is detected.

33. The apparatus of claim 32 further comprising means for providing a seed to the computing means, the computing means computing the CAC as a known function of the seed and the BD_ADDR associated with the master device.

34. The apparatus of claim 33 wherein the known function is a one-way function.

35. The apparatus of claim 33 wherein the seed is at least a first random number generated by at least one of the devices for use in computing the CAC used in messages within a current session.

36. The apparatus of claim 35 wherein the seed is a combination of the first random number and at least a second random number generated by at least one of the devices for use in computing the CAC used in messages within at least one previous session.

37. The apparatus of claim 32 wherein the changing means changes the CAC on a periodic basis within the duration of a session once the session begins.

38. The apparatus of claim 37 further comprising means for providing a seed to the computing means, the computing means computing the CAC as a known function of the seed and the BD_ADDR associated with the master device.

39. The apparatus of claim 38 wherein the seed is a combination of at least a time parameter associated with at least one of the devices and a first random number generated by at least one of the devices for use in computing the CAC used in messages within a current session.

40. The apparatus of claim 39 wherein the seed is a combination of the time parameter associated with at least one of the devices, the first random number, and at least a second random number generated by at least one of the devices for use in computing the CAC used in messages within at least one previous session.

* * * * *